(12) United States Patent
Greiger

(10) Patent No.: US 6,525,991 B2
(45) Date of Patent: Feb. 25, 2003

(54) COUPLING DEVICE TO ATTACH AUXILIARY EQUIPMENT TO A MARINE SEISMIC CABLE

(75) Inventor: Stephen Lee Greiger, Needville, TX (US)

(73) Assignee: Concord Technologies L.L.P., Houston, TX (US)

( * ) Notice: Subject to any disclaimer, the term of this patent is extended or adjusted under 35 U.S.C. 154(b) by 6 days.

(21) Appl. No.: 09/790,734

(22) Filed: Feb. 22, 2001

(65) Prior Publication Data

US 2002/0114215 A1 Aug. 22, 2002

(51) Int. Cl.[7] .............................. G01V 1/38; F16D 1/00
(52) U.S. Cl. ........................................... 367/16; 403/24
(58) Field of Search ....................... 367/16, 17; 403/24; 114/245

(56) References Cited

U.S. PATENT DOCUMENTS

| | | | |
|---|---|---|---|
| 3,931,608 A | 1/1976 | Cole | 340/7 PC |
| 4,541,079 A | 9/1985 | Thigpen | 367/19 |
| 4,711,194 A | 12/1987 | Fowler | 320/245 |
| 4,823,325 A | 4/1989 | Cole, Jr. | 367/20 |
| 5,214,612 A | 5/1993 | Olivier et al. | 367/16 |
| 5,404,339 A | 4/1995 | Cole, Jr. | 367/16 |
| 5,709,497 A | 1/1998 | Zoch et al. | 403/24 |
| 5,949,214 A | 9/1999 | Broussard et al. | 320/107 |
| 6,016,286 A | 1/2000 | Olivier et al. | 367/17 |
| 6,019,652 A | 2/2000 | Nielsen et al. | 441/133 |
| 6,142,092 A | 11/2000 | Coupland | 114/331 |
| 6,188,646 B1 | 2/2001 | Luscombe et al. | 367/154 |
| 6,239,363 B1 | 5/2001 | Wooters | 174/47 |

*Primary Examiner*—Gregory J. Toatley, Jr.
(74) *Attorney, Agent, or Firm*—Moser, Patterson & Sheridan, L.L.P.

(57) ABSTRACT

A quick-acting retainer assembly to mount auxiliary equipment to a seismic cable is provided. The retainer assembly includes a crescent-shaped outer retainer ring adapted to slip easily over a cable and then slide into position over a mating inner race. The outer ring is provided with a spring-loaded cam knob which conveniently conforms to the outer surface of the outer ring and, when the cam knob is turned, it disengages the outer ring from the from the inner race. To attach the outer ring to the inner race, a pin attached to the cam knob rides up on a bevel or slanted plane of the inner race without any further manual action until the pin engages the inner race.

13 Claims, 2 Drawing Sheets

COUPLING DEVICE TO ATTACH AUXILIARY EQUIPMENT TO A MARINE SEISMIC CABLE

FIELD OF THE INVENTION

The present invention relates generally to the field of auxiliary equipment for marine seismic cables and, more particularly, to a quick acting collar for the attachment of auxiliary equipment to such a cable, and even more particularly to a collar for the coupling of a depth control device to such a cable.

BACKGROUND OF THE INVENTION

In the course of conducting marine seismic surveys for oil and gas, it is customary to tow long cables, often 3 to 6 kilometers long, beneath the surface of the water astern of a survey ship. As many as twelve of these cables can be towed at one time. Each cable contains hundreds, and perhaps thousands, of hydrophones as well as the electronic systems required to receive reflected seismic signals and transmit this data back to the survey ship to be recorded. These cables may be constructed using semi-solid materials or oil filled tubes, and they are normally two to three inches in diameter.

When conducting a seismic survey, the cable must be towed at a predetermined depth and means must be provided to maintain this depth at all times. In conventional surveys, the tow depth is usually thirty to fifty feet, plus or minus two feet, which is a very tight tolerance when considering the harsh environment in which such systems typically operate. Maintenance of tow depth is accomplished by the use of depth control devices called "birds". A plurality of birds are attached to the cable at intervals of one hundred to three hundred meters. These birds are fitted with horizontally oriented wings that can be commanded to cause the cable to dive or rise depending on the pitch of the wings. The birds are self-powered and receive direction from the survey ship without direct electrical connection to the cable, but by electromagnetic coupling. Other modules are also attached to the cable, and all such modules are referred to herein as auxiliary equipment.

As cables are deployed from their respective reels, the birds must be installed at the required intervals. When the cables are retrieved, the birds must then be removed from the cables before the cables are wound on their storage reels. Deployment and retrieval operations are very critical periods in the overall seismic exploration and these operations must be accomplished with speed and accuracy. At times of sudden changes in sea state for example, this is most important since the cables must be expeditiously retrieved to avoid damage or loss of cables. Even in ideal weather conditions, time is money on seismic survey vessels and the less time that is taken to deploy and retrieve cables the more time can be spent in exploration for hydrocarbons.

It is necessary that the cable be able to rotate freely within the bird attachment locations. This commonly achieved by clamping a split concentric cylinder around the cable which has a concentric groove on the exterior and this assembly functions as the inner part of the bearing. Conventional birds use a concentric outer race, which is attached to the bird and is hinged to mate with the inner bearing and is oriented within a groove on the inner race. This hinged assembly is secured by screws or by a latching device. Such an attaching arrangement may be better understood from Cole, U.S. Pat. No. 3,931,608, incorporated herein by reference.

Each bird has two rotating attachment points allowing the bird to remain suspended beneath the cable at all times. Unfortunately, attachment of the hinged assembly requires a certain amount of dexterity, and in inclement weather, such an operation can lengthen the time required to attach or detach birds from the cable. Thus, there remains a need for a coupling assembly that is simple, easy, and quick to expedite the coupling and decoupling of auxiliary equipment to and from the cables.

SUMMARY OF THE INVENTION

The present invention addresses this need in the art by providing a crescent-shaped outer retainer ring adapted to slip easily over a cable and then slide into position over a mating inner race. The outer ring is provided with a spring-loaded cam knob which conveniently conforms to the outer surface of the outer ring and, when the cam knob is turned, it disengages the outer ring from the from the inner race. To attach the outer ring to the inner race, a pin attached to the cam knob rides up on a bevel or slanted plane of the inner race without any further manual action until the pin engages the inner race.

These and other features of the invention will be apparent to those of skill in the art from a review of the following detailed description along with the accompanying drawings.

DETAILED DESCRIPTION OF A PREFERRED EMBODIMENT

Figure 1:
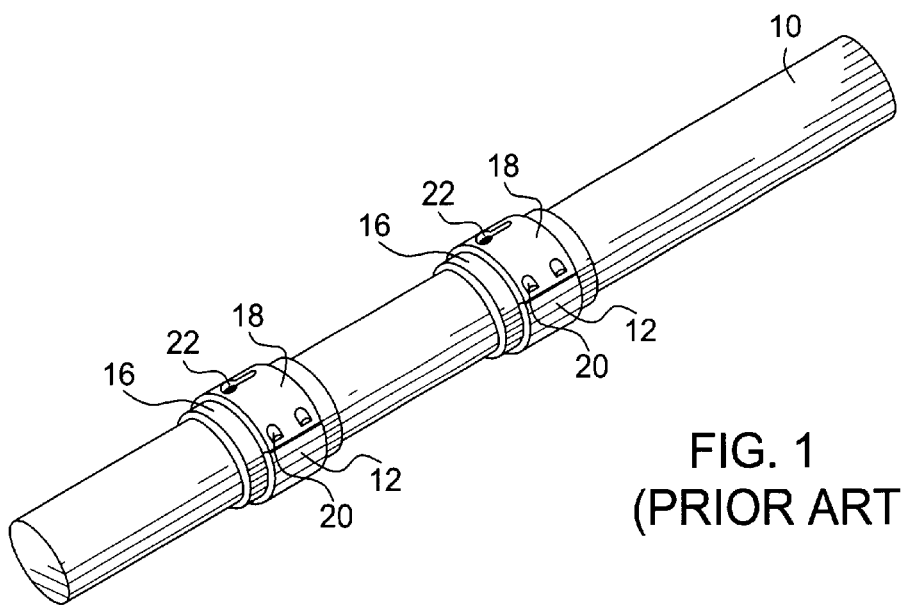
FIG. 1 is a perspective view of a marine seismic cable with prior art couplings.

FIG. 1 depicts a marine seismic cable 10 with a pair of conventional mounting collar assemblies 12 attached to the cable 10. Each assembly 12 includes an inner race 16, formed of two half-cylinders joined together by screws or other suitable means. The inner race is typically firmly affixed to the cable 10 by the constrictive clamping force when two mating halves are screwed together on a semi-solid cable. In the case of oil filled cables, positioning is attained by clamping the race adjacent to a rigid internal spacer thereby limiting movement of the assembly. Oil filled cables have internal spacers (not shown) throughout the cable and they are spaced at intervals of 10 to 12 inches. The inside diameter of the internal race is less than the outside diameter of the cable and therefore cannot pass over a spacer. A pair of such inner races is joined to the cable to provide stable contact points for auxiliary equipment to be hung from the cable.

The inner race 16 includes a reduced diameter center section formed between end shoulders (shown and described below in regard to FIG. 3) to receive an outer race or locking collar 18. The locking collar 18 in the prior art is preferably formed of two half-cylinders joined together with screws 20. The locking collar 18 is free to rotate with respect to the inner race 16. The locking collar 18 also includes locking slots 22 to receive to receive a locking pin (not shown) with which to mount auxiliary equipment, such as a bird, to the cable. The weight of the auxiliary equipment thus cause the equipment to hang down below the cable when it is installed and in use in the water.

Figure 2:
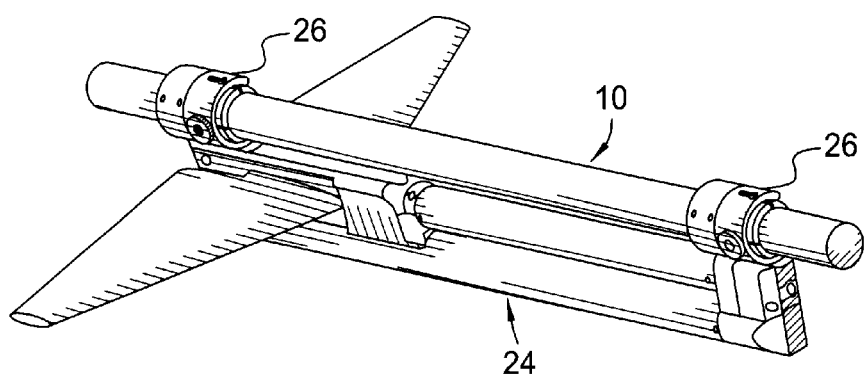
FIG. 2 is a perspective view of a marine seismic cable with a bird attached using the coupling of the present invention.

A significant problem with the prior art assembly shown in FIG. 1 is the difficulty in attaching auxiliary equipment to the locking collar, especially in high winds and heavy seas. The locking pins, one for each locking collar, must be inserted into the locking slots and then locked down using a hand tool. This can be hard to do on a wet, rolling deck. The present invention addresses this drawback. As shown in FIG. 2, the present invention provides a quick and easy way to couple auxiliary equipment, such as a bird 24 to a cable 10, including a pair of retainer assemblies 26, one forward and one aft.

Figure 3:
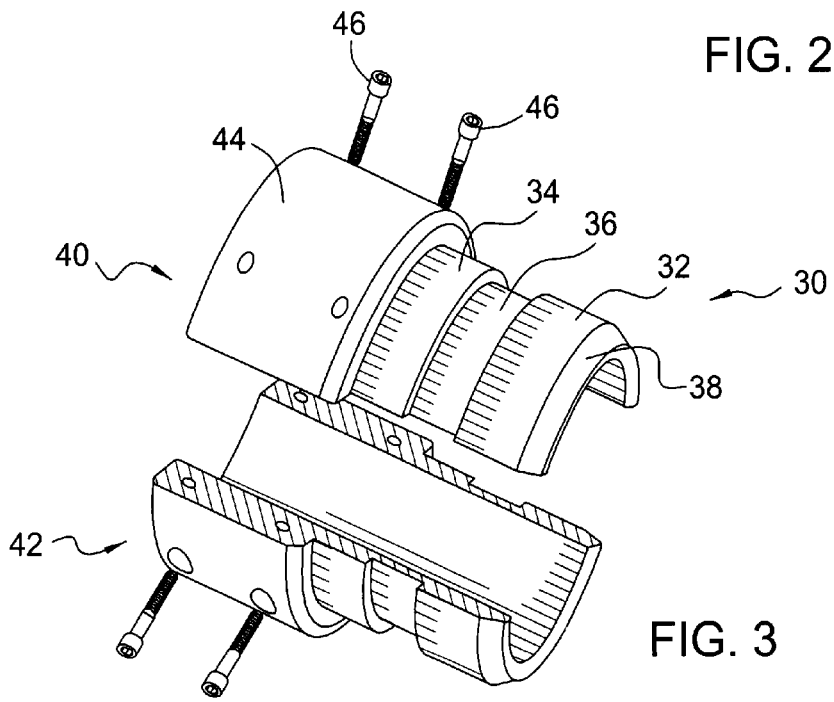
FIG. 3 is a partially exploded, perspective view of an inner bearing of the coupling of the present invention.
Figure 4:
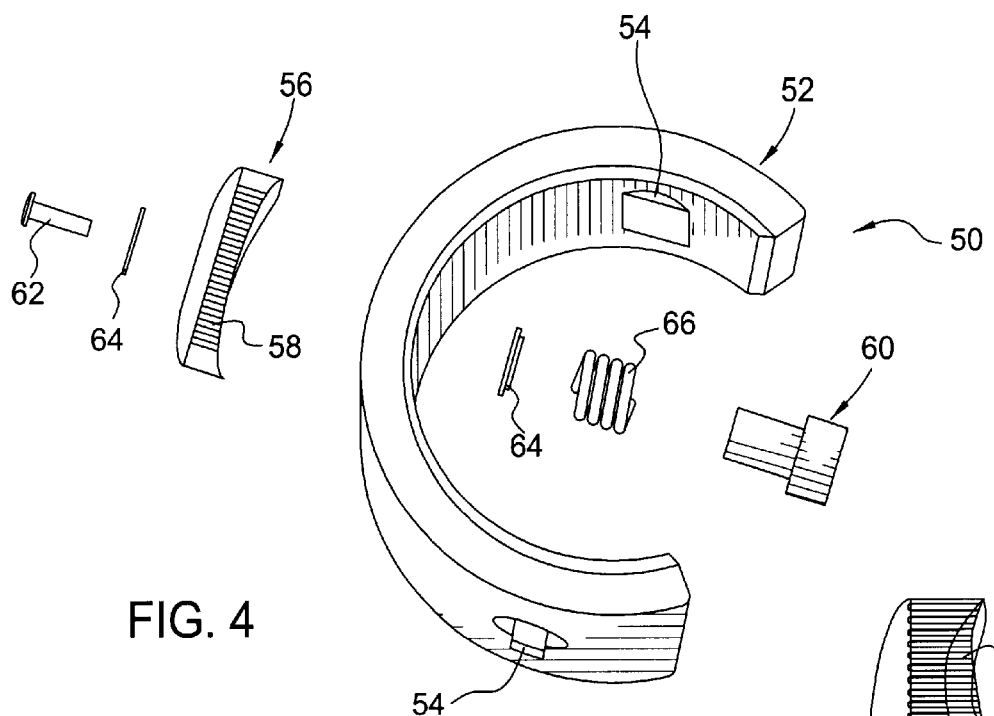
FIG. 4 is a partially exploded, perspective view of the retainer assembly of the invention.

The present invention comprises primarily two components, a modified inner race 30, shown in FIG. 3, and a crescent shaped outer race 50, shown in FIG. 4. The inner race 30 includes a forward shoulder 32 and an aft shoulder 34, with a reduced diameter groove 36 between the shoulders. The forward shoulder 32 has a bevel or slanted plane 38 which cooperates with the outer race for ease of coupling the inner and outer races, as described below with regard to FIG. 4.

The inner race 30 is preferably formed of upper and lower cylindrical portions 40 and 42, respectively. The upper and lower cylindrical portions are preferably coupled together at an after stop region 44 with a set of screws 46, for example. The inner race is mounted a predetermined distance from another inner race, and remains on the cable when the cable is reeled onto a spool on the deck of the vessel.

Figure 4A:
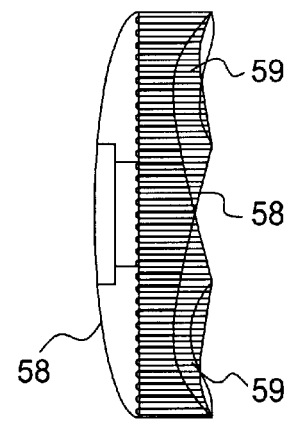
FIG. 4a is a detail view of an alternative, preferred cam knob which finds application in the present invention.

The inner race 30 is designed to quickly and easily receive the outer race 50, shown in FIG. 4. The outer race comprises a crescent shaped locking ring 52 with a pair of locking slots 54 formed on the top and the bottom. While only one of the locking slots 54 is used at a time, two such slots are formed in the element 52 so that the locking element 52 is reversible for ease of installation. The outer race 50 further includes a cam knob 56 having a curved inner surface 58 of about the same radius of curvature as the outer diameter of the ring 52. As shown in FIG. 4a, the cam knob may also preferably have two small curved surfaces 59 at 90° from the aforementioned curved surface which serves as a detent allowing the operator to sense the position of the cam by feel only. The cam knob 56 is fixedly-joined to a retaining pin 60 with a pin, bolt, or screw 62 and washers 64. A compression spring 66 holds the retaining pin 60 away from the inner surface of the ring 52 a sufficient distance to engage the groove 36 of the inner race 30. When the cam knob 56 is turned 90°, the inner surface 58 of the knob rides up on the outer surface of the ring 52, pulling the pin 60 against spring pressure to disengage the pin 60 from the groove, thereby disengaging the inner and outer races. To engage the inner and outer races when installing auxiliary equipment such as a bird, the pin 60 rides up against the plane 38 and onto the shoulder 32 without having to touch the knob 56, another feature of the present invention.

Figure 5:
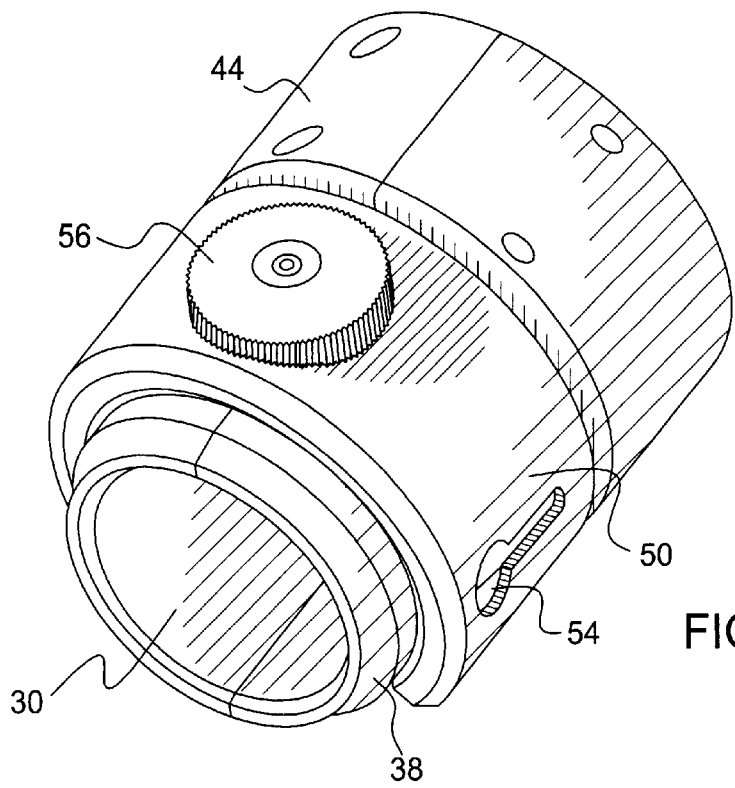
FIG. 5 is a perspective view of the inner bearing and retainer assembly joined together.

FIG. 5 shows the inner and outer races engaged. It is to be understood that typically the inner race will be permanently installed on the cable 10, while the outer race will be semi-permanently installed on the auxiliary equipment. Keeping in mind that there are two retainer assemblies, one forward and one aft, to attach the auxiliary equipment, the rings 52 are inserted over the cable 10 forward of the inner races, and the auxiliary equipment is then slid back so that the respective retaining pins 60 ride up the planes 38 and onto the shoulders 32 until the pins 60 drop down into the grooves 36. To remove the auxiliary equipment, the knobs 56 are turned 90° thereby pulling the retaining pins 60 up from the grooves 36 and the auxiliary equipment is then slid forward to free the rings from the cable.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A coupling device to attach auxiliary equipment to a marine seismic cable, the cable defining a forward direction and an aft direction and further defining a cable diameter, the coupling device comprising:
    a. a substantially cylindrical inner race firmly affixed to the cable, the inner race having spaced apart shoulders defining an inner race diameter, the inner race further defining a groove between the shoulders; and
    b. a crescent-shaped locking ring defining a portion of a cylinder having an outer diameter and an inner surface and further having an opening at least as large as the cable diameter, the locking ring further having a pin therethrough for engaging the groove.

2. The coupling device of claim 1 further comprising a cam knob coupled to the pin.

3. The coupling device of claim 2, wherein the cam knob defines a first curved surface to conform to the outer diameter of the locking ring.

4. The coupling device of claim 3, wherein the cam knob defines a second curved surface to conform to the outer diameter of the locking ring, and wherein the second curved surface is positioned 90° from the first curved surface.

5. The coupling device of claim 1, further comprising a compression spring between the pin and the inner surface of the locking ring.

6. The coupling device of claim 1, further comprising a stop region formed as an integral part of the inner race and adapted for abutting contact with the locking ring.

7. The coupling device of claim 1, wherein the inner race is formed of substantially identical half cylinders joined together.

8. The coupling device of claim 1, wherein the shoulders define a forward shoulder and an after shoulder, and further comprising a bevel on the forward shoulder adapted for sliding contact with the pin.

9. The coupling device of claim 1, wherein the auxiliary equipment is a level control device.

10. A method of coupling auxiliary equipment to a marine seismic cable with a pair of coupling devices, the cable defining a forward direction and an aft direction and further defining a cable diameter, each of the coupling devices comprising a substantially cylindrical inner race firmly affixed to the cable, the inner race having spaced apart shoulders defining an inner race diameter, the inner race further defining a groove between the shoulders, and a crescent-shaped locking ring defining a portion of a cylinder having an outer diameter and an inner surface and further having an opening at least as large as the cable diameter, the locking ring further having a pin therethrough for engaging the groove, the method comprising the steps of:
    a. inserting the cable through the opening in each of the locking rings at a position forward of the inner races; and b. moving the locking rings aft until each of the pins engages its respective groove.

11. The method of claim 10, wherein the pin is spring loaded and wherein the shoulders define a forward shoulder and an after shoulder, and further comprising a bevel on the forward shoulder adapted for sliding contact with the pin, and wherein the step of moving the locking rings aft causes each of the pins to ride up its respective bevel onto its respective forward shoulder and into its respective groove.

12. The method of claim 10, wherein the auxiliary equipment comprises a level control device.

13. A method of de-coupling auxiliary equipment from a marine seismic cable, the auxiliary equipment joined to the cable with a pair of coupling devices, the cable defining a forward direction and an aft direction and further defining a cable diameter, each of the coupling devices comprising a substantially cylindrical inner race firmly affixed to the cable, the inner race having spaced apart shoulders defining an inner race diameter, the inner race further defining a groove between the shoulders, and a crescent-shaped locking ring defining a portion of a cylinder having an outer diameter and an inner surface and further having an opening at least as large as the cable diameter, the locking ring further having a spring loaded pin therethrough for engaging the groove and the pin coupled to a cam knob coupled to the pin and positioned on the outer diameter of the locking ring, the method comprising the steps of:

a. turning the cam knob by about 90°, thereby disengaging each of the pins from its respective groove;

b. sliding the locking rings forward clear of the inner races; and c. removing the locking rings from the cable.

* * * * *